United States Patent
Arnold-Huyser et al.

(10) Patent No.: US 7,890,254 B2
(45) Date of Patent: Feb. 15, 2011

(54) POINT-OF INTEREST DISPLAY SYSTEM

(75) Inventors: Nisa M. Arnold-Huyser, Zeeland, MI (US); Alan S. Hughes, Holland, MI (US); John S. Bambini, Kentwood, MI (US); Ian Milstead, Elmhurst, IL (US); Susan K. Sonday, Holland, MI (US)

(73) Assignee: Johnson Controls Technology Company, Holland, MI (US)

( * ) Notice: Subject to any disclaimer, the term of this patent is extended or adjusted under 35 U.S.C. 154(b) by 1194 days.

(21) Appl. No.: 10/532,025

(22) PCT Filed: Oct. 20, 2003
(Under 37 CFR 1.47)

(86) PCT No.: PCT/US03/33242
§ 371 (c)(1),
(2), (4) Date: Feb. 23, 2006

(87) PCT Pub. No.: WO2004/038681
PCT Pub. Date: May 6, 2004

(65) Prior Publication Data
US 2008/0097697 A1    Apr. 24, 2008

Related U.S. Application Data

(60) Provisional application No. 60/419,934, filed on Oct. 21, 2002.

(51) Int. Cl.
G01C 21/30 (2006.01)
(52) U.S. Cl. .................... 701/208; 701/207; 701/209; 701/201; 701/211; 701/300; 340/995.1; 340/995.19; 340/995.24

(58) Field of Classification Search ............... 701/208, 701/206, 207, 209, 210, 211; 340/995.1, 340/995.11, 995.16, 995.14, 995.17, 995.24, 340/995.27, 995.28, 995.2
See application file for complete search history.

(56) References Cited

U.S. PATENT DOCUMENTS 5,459,667 A * 10/1995 Odagaki et al. ............. 701/209

(Continued)

FOREIGN PATENT DOCUMENTS

WO    WO 2004/038446 A2    5/2004

(Continued)

OTHER PUBLICATIONS

International Search Report for International Application No. PCT/US03/33242 mailed Jul. 2, 2004, 3 pages.

(Continued)

*Primary Examiner*—Khoi Tran
*Assistant Examiner*—Jonathan L Sample
(74) *Attorney, Agent, or Firm*—Foley & Lardner LLP

(57) ABSTRACT

A point-of-interest display system includes an updateable database which interfaces with a microprocessor which receives data from a GPS receiver providing the system with current vehicle location and direction of travel information. A display provides the operator textural and elemental graphic display information, and easily accessible control switches allow the operator to select upcoming highway exits, categories of points of interest, and points of interest and display directions to a selected entry.

12 Claims, 13 Drawing Sheets

U.S. PATENT DOCUMENTS

| | | | |
|---|---|---|---|
| 5,767,795 A | | 6/1998 | Schaphorst |
| 5,991,690 A | * | 11/1999 | Murphy ................... 701/211 |
| 6,014,090 A | | 1/2000 | Rosen et al. |
| 6,047,237 A | | 4/2000 | Michmerhuizen |
| 6,049,755 A | * | 4/2000 | Lou et al. ................ 701/207 |
| 6,289,276 B1 | | 9/2001 | Ahrens et al. |
| 6,351,698 B1 | * | 2/2002 | Kubota et al. .............. 701/51 |
| 6,434,482 B1 | * | 8/2002 | Oshida et al. ............. 701/209 |
| 6,816,783 B2 | | 11/2004 | Hashima et al. |
| 2001/0032880 A1 | * | 10/2001 | Levine ..................... 235/384 |
| 2002/0011951 A1 | | 1/2002 | Pepin et al. |
| 2002/0049535 A1 | | 4/2002 | Rigo et al. |
| 2002/0152021 A1 | | 10/2002 | Ota et al. |
| 2002/0164962 A1 | * | 11/2002 | Mankins et al. ............. 455/99 |
| 2003/0018427 A1 | * | 1/2003 | Yokota et al. ............. 701/208 |
| 2008/0097697 A1 | * | 4/2008 | Arnold-Huyser et al. .... 701/300 |

FOREIGN PATENT DOCUMENTS

| | | |
|---|---|---|
| WO | WO 2004/038681 A2 | 5/2004 |
| WO | WO 2004/038686 A2 | 5/2004 |
| WO | WO 2004/038687 A2 | 5/2004 |

OTHER PUBLICATIONS

U.S. Office Action for U.S. Appl. No. 10/532,199, mailed Nov. 9, 2009, 11 pages.

International Search Report based on International Patent Application No. PCT/US2003/033284 mailed Jun. 29, 2004, 2 pages.

International Search Report based on International Patent Application No. PCT/US2003/033256 mailed Jun. 30, 2004, 2 pages.

International Search Report based on International Patent Application No. PCT/US2003/033287 mailed Jul. 28, 2004, 3 pages.

* cited by examiner

POINT-OF INTEREST DISPLAY SYSTEM

BACKGROUND OF THE INVENTION

The present invention relates to a display system for a vehicle and particularly to one which provides a display of selected names of points of interest arranged by category and elemental directions to a selected point of interest. One embodiment provides a graphic display of cross-streets or addresses as the vehicle travels along a local roadway.

There exist numerous vehicle navigation systems which provide graphic map displays, which allow the vehicle operator, through significant manipulation of controls, to plan a travel route and obtain information about arrival destinations, typically by address. Some systems provide navigation control through the use of voice recognition programs and control circuits. All of these systems are relatively expensive, complicated and difficult for a vehicle operator to utilize, particularly when preoccupied with surrounding traffic in congested areas. Some suggested simplified navigation systems allow the vehicle operator to either identify his or her current location by street address and forthcoming intersection information, as well as basic points of interest information. Such systems are relatively inexpensive but do not provide the operator with the flexibility of providing points-of-interest information in a user-friendly format nor additional desirable features, such as easily accessible alternate displays of forthcoming highway exits, street intersections, or street addresses when traveling on a local street.

Thus, there remains a need for a display system for a vehicle which is relatively inexpensive and is user-friendly to operate using a minimum number of intuitive controls. Such a system needs to provide desirable features, such as points of interest in selected categories which can be easily accessed with minimal operator intervention and yet provide the operator with sufficient information to be able to locate and travel to such points-of-interest.

SUMMARY OF THE INVENTION

The system of the present invention satisfies this need by providing a point-of-interest display system in which an updateable database includes road network information, which can be updated at relatively infrequent time intervals, and point-of-interest information which can be user-updated at more frequent intervals, as new points of interest become available. In a preferred embodiment of the invention, the database is carried on the vehicle in the form of a flashcard or other removable memory device or loaded into flash memory residing in the vehicle via a data communication system. The database interfaces with a microprocessor on the vehicle which receives data from a current position detector, such as a GPS receiver, providing the system with current vehicle location and direction of travel information. A display provides the operator textural and elemental graphic display information, and one or more control switches are positioned in an easily accessible location within the vehicle such that the operator, by scrolling through displayed highway exits, can select categories of points of interest, and points of interest within a category upon the actuation of a minimal number of switches in an intuitive sequence.

In one embodiment of the invention, two modes of operation provide point-of-interest information either while the vehicle is traveling on a limited access highway or, once the vehicle has exited the highway, provides more specific point-of-interest directions. In another embodiment of the invention, the operator can, when on a local road, select the textural display of forthcoming and past intersecting streets, which is updated as the vehicle travels along the roadway. In yet another embodiment of the invention, the navigation system provides a display of the street addresses on which the vehicle is traveling and increments, decrements, or otherwise updates the address as the vehicle moves. In a preferred embodiment of the invention, each of these features are incorporated in a system which allows selection between the features, either manually or automatically as the vehicle moves between a limited access highway and a local roadway.

These and other features, objects and advantages of the present invention will become apparent upon reading the following description thereof together with reference to the accompanying drawings.

DETAILED DESCRIPTION OF THE PREFERRED EMBODIMENT

Figure 1:
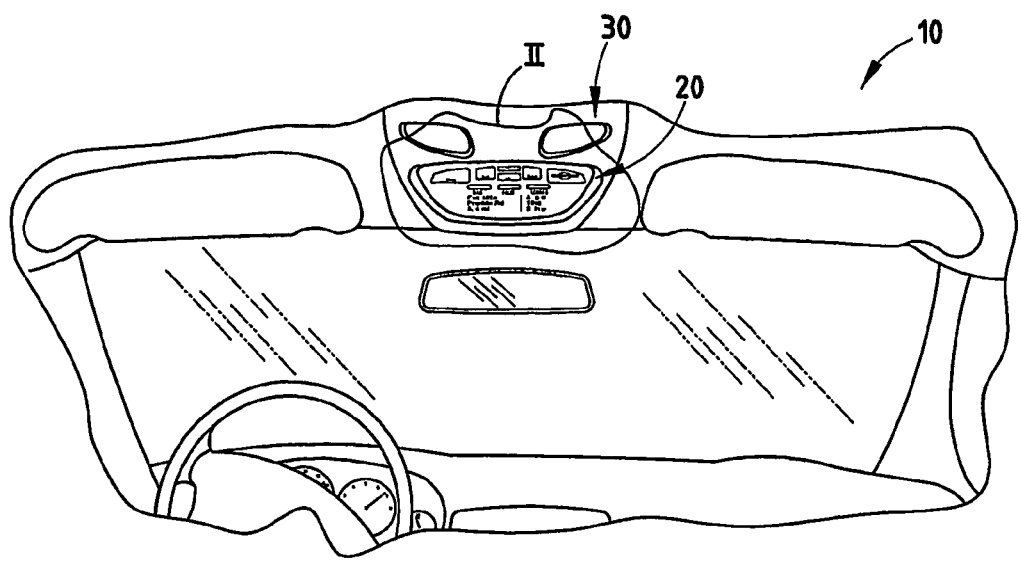
FIG. 1 is a fragmentary perspective view of a vehicle having a point-of-interest display system embodying the present invention.

Referring initially to FIG. 1, there is shown a vehicle 10, such as an automobile, van, sports utility vehicle, truck, or the like, which incorporates a point-of-interest display system of one embodiment of the present invention. The point-of-interest display system 20 is mounted in one embodiment in an overhead console 30, although it can be mounted at any conveniently accessible location within easy reach of the vehicle operator, such as in the instrument panel. The point-of-interest system includes a switch group 24 and a display section 26, shown in detail in FIG. 2. The point-of-interest system can be mounted within a housing 22, which includes both the display 26 and switch section 24, as well as a memory card slot 28 for receiving a removable memory card 29, such as a flashcard on which the point-of-interest and road network data is programmed. Alternatively, separate mounting of the components is possible.

Figure 4:
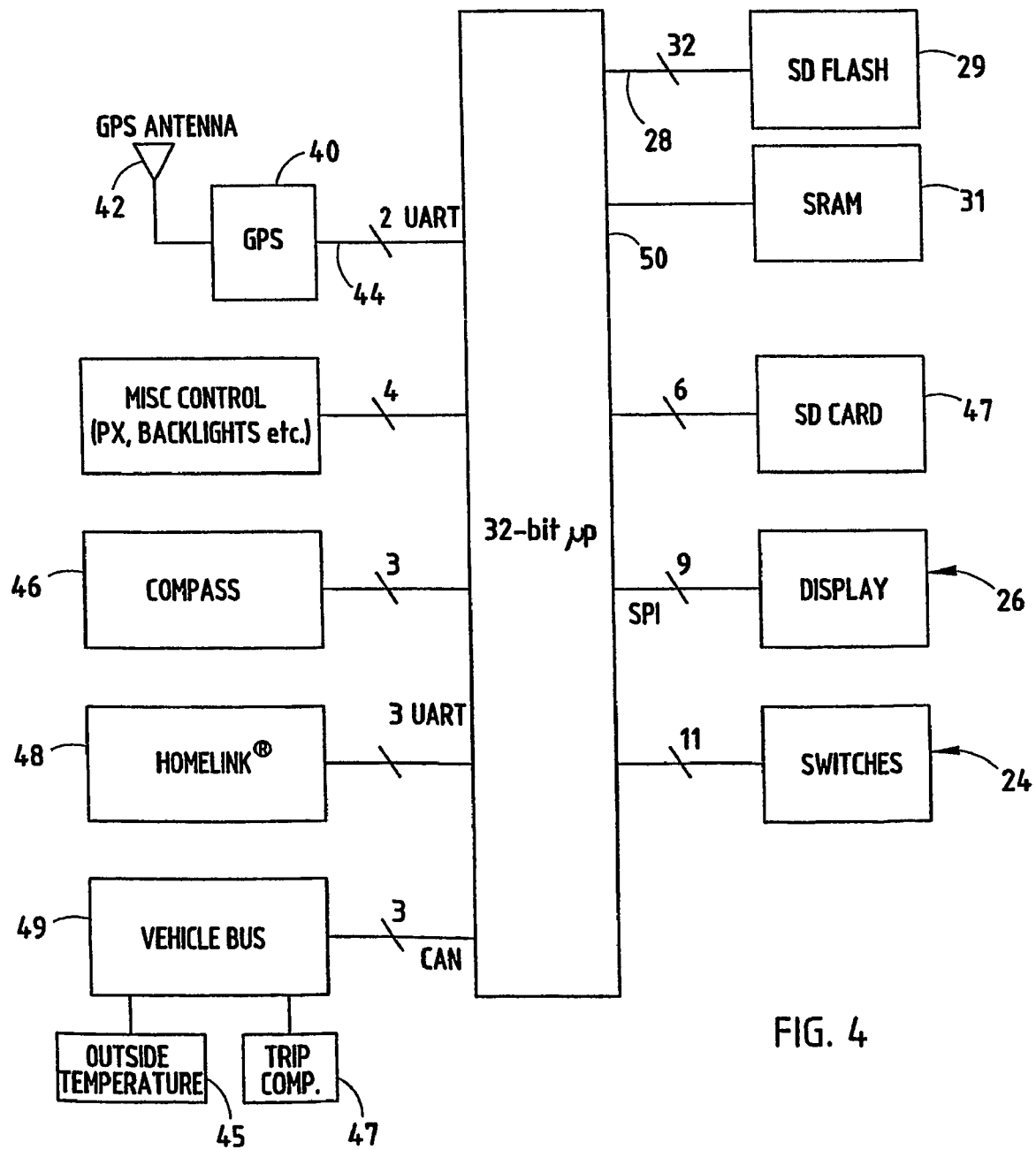
FIG. 4 is a block electrical circuit diagram of the point-of-interest system including its major components.
Figure 5:
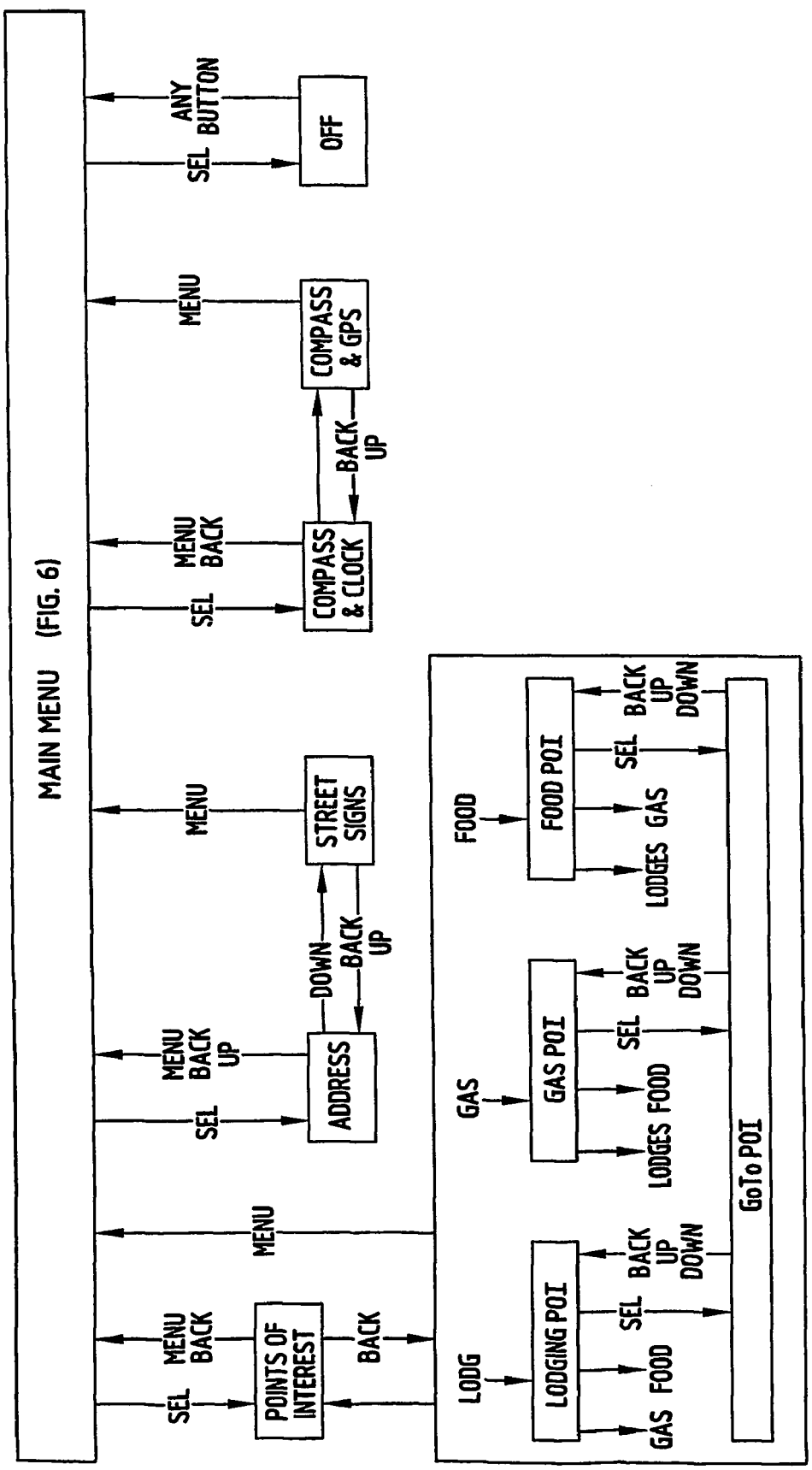
FIG. 5 is a flow diagram showing the menu operation for operation of the system shown in FIGS. 1-4.
Figure 22A:
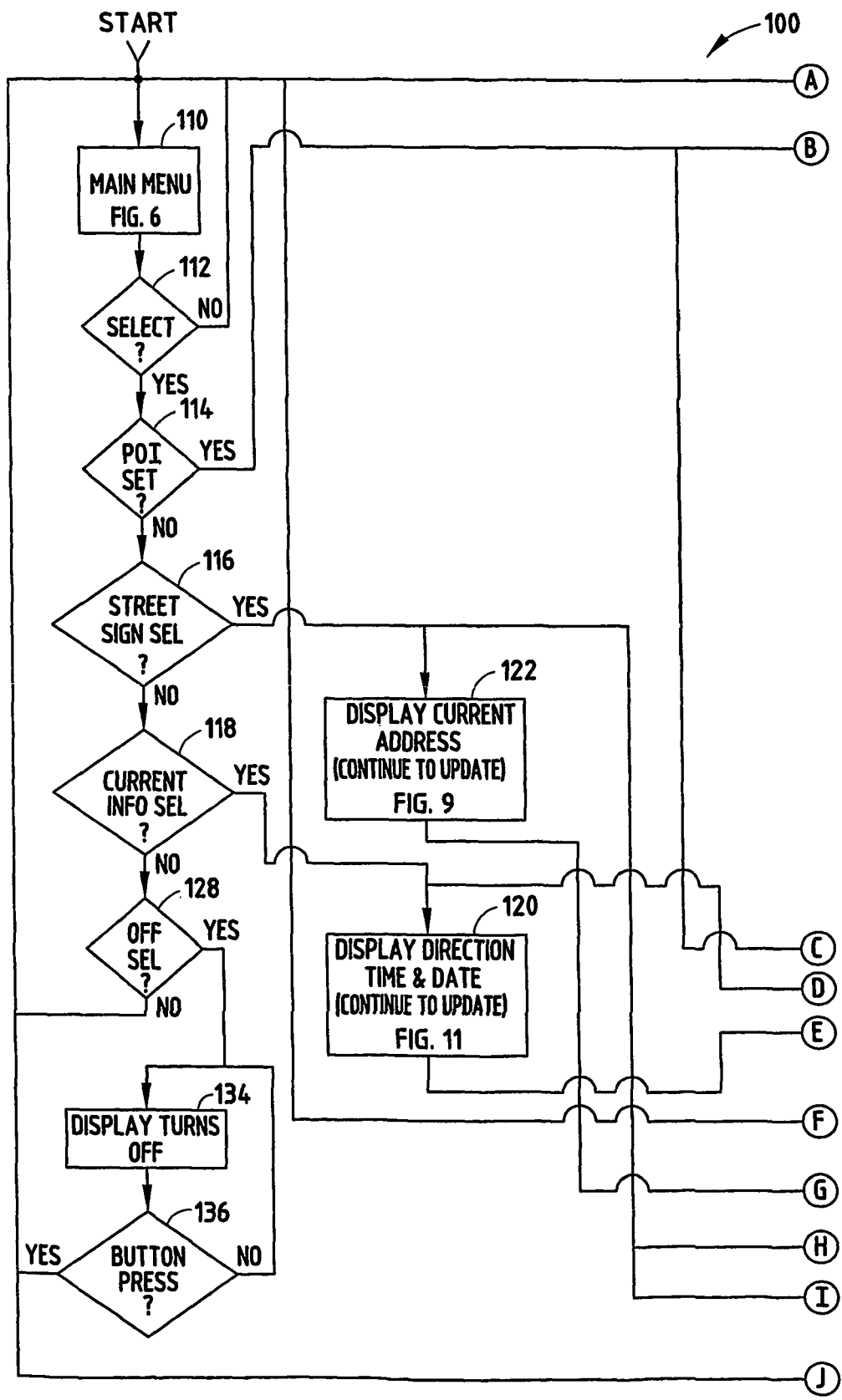
FIGS. 22A, 22B, and 22C are a detailed flow diagram of the programming of the system during operation.
Figure 22B:
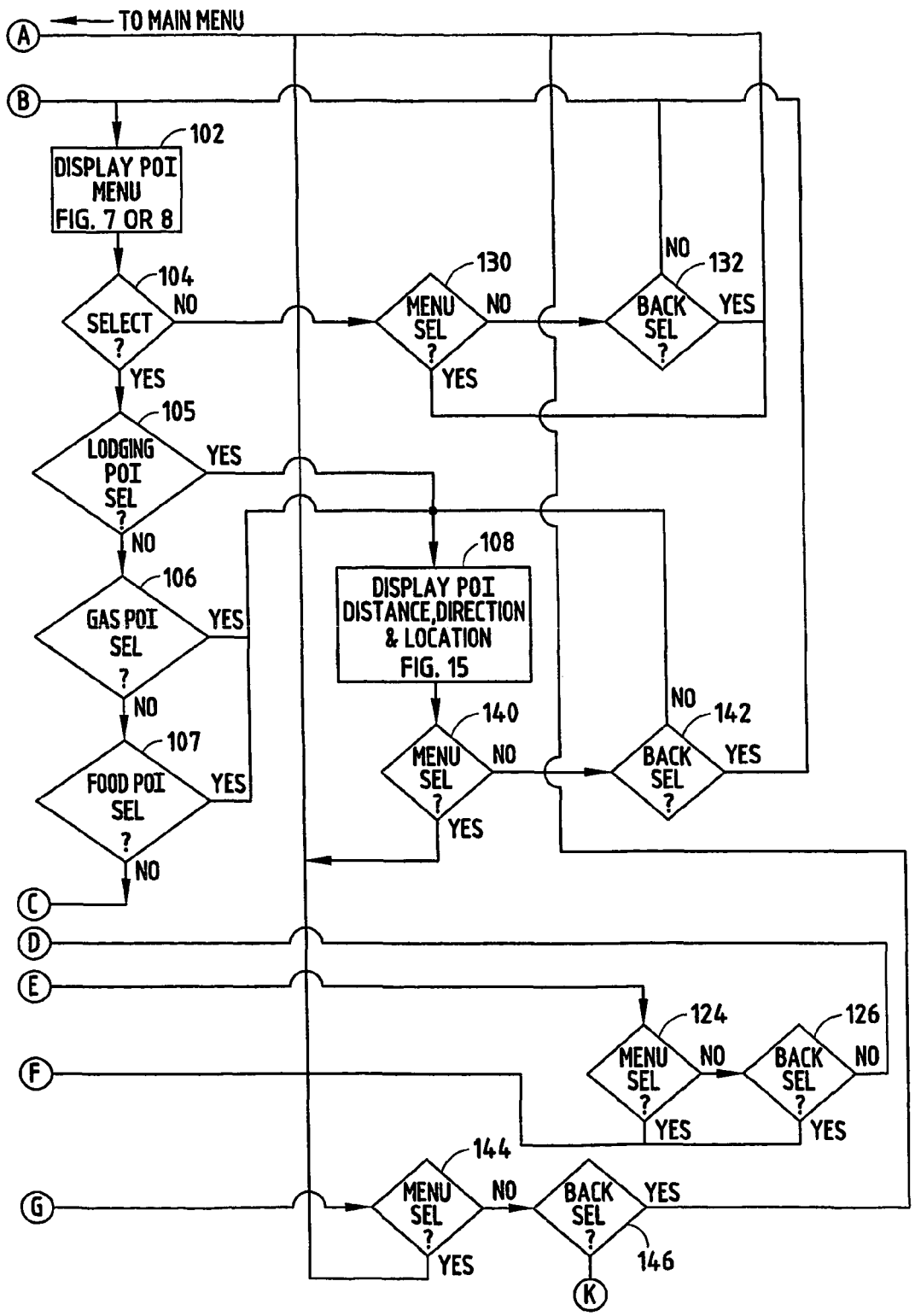
Figure 22C:
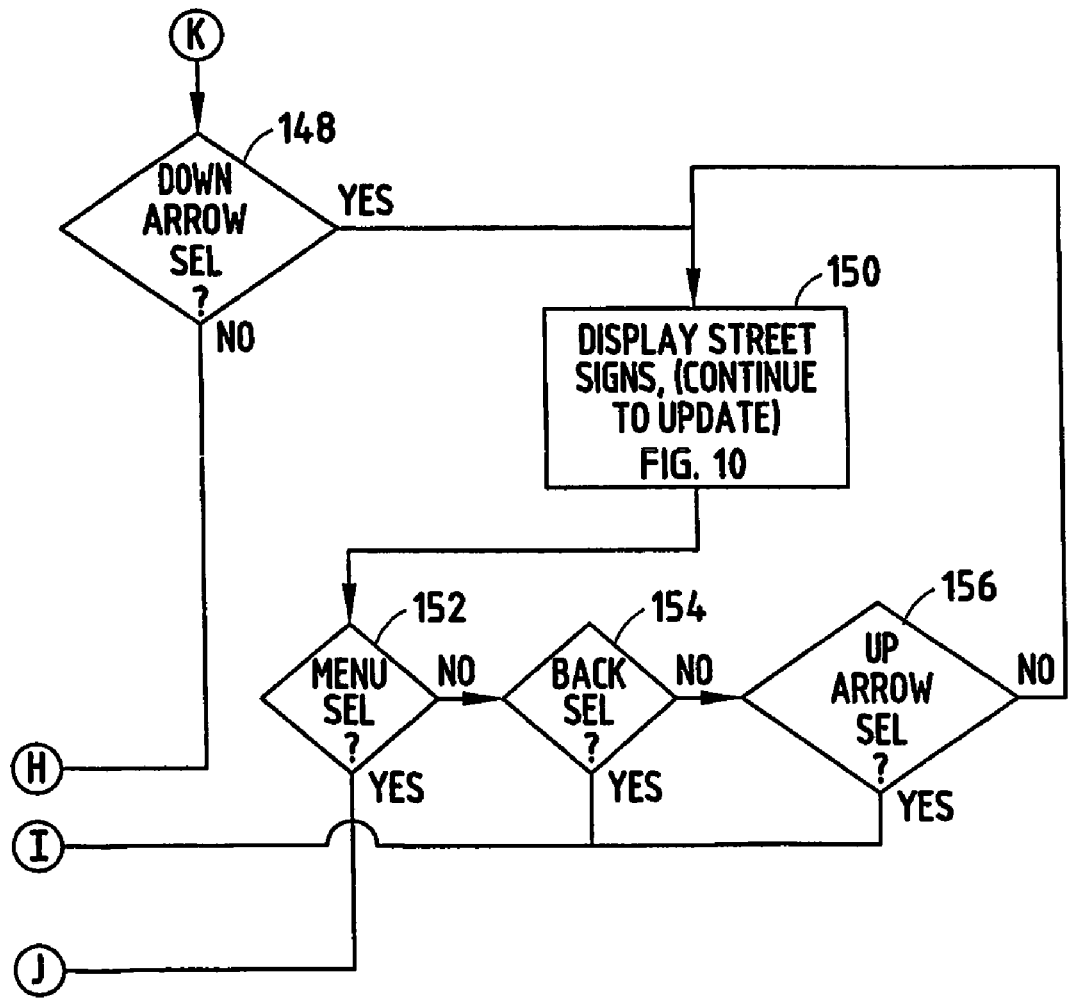

The memory card 29 typically will be at least a 128 meg card, although 256 or 512 meg cards may be preferred. The memory card is removable from slot 28, such that data thereon, including road network information and point-of-interest (POI) information, can be separately programmed in layers thereon, such that the road network and POI data can be refreshed at different, periodic intervals. Memory card 29 includes nonvolatile memory and contains a handshake code to communicate with a microprocessor 50 (FIG. 4) of the system, so the microprocessor can read data on the memory card 29. The system, as seen in FIG. 4, also includes a programmable SRAM memory 31, which contains the program for the sequential operation of the system, as shown in FIG. 5. The flow diagram for the program is shown in FIGS. 22A, 22B, and 22C, described below. In one embodiment memory card 29 can be obtained from a car dealer with an update subscription service for refreshing the data on the card either annually, in the case of road network information, or more frequently as new points of interest may become available, such as, for example, on a monthly basis. Alternatively, the user may subscribe to a web site providing download information for refreshing the data on memory card 29 on a personal computer if desired. Card 29 may also be updated through other means. Typically, the memory card will have data sufficient for a regional area in which the vehicle normally travels and will contain points of interest according to categories, such as gas, food, and lodging, as well as all the major (i.e., limited access) and secondary road identifications and street addresses for secondary roads.

The map database is composed of at least two layers, at least one of which includes data like points of interest that change frequently. It is, therefore, desirable to update this information frequently. Another layer or layers of data contain information like the road network that may be undated less frequently. The data layers are linked and each layer may be updated either independently or in combination with other layers. This allows the consumer to obtain updated information without excessive download time when refreshing the data through the Internet, since the update can be limited to the part of the data that changes frequently.

Each layer is contained within a single file on the flashcard 29 for a given geographical area. Every POI record, whether for highway or local coverage, references a street name record in the road network file. This reference is stored in the POI file as an index into the street name table in the road network file.

As the latest POI information is released and compiled, every POI file that is created is associated with the latest road network file available. In addition, any new points of interest that are associated with roads that are not yet compiled into the latest road network file are added to the POI file but are flagged as being without a street name. All other POI attributes, such as telephone number, latitude/longitude and name, are still available in this case. Details of some aspects of the programming of they system to provide the various modes of operation are disclosed in application Ser. No. 60/419,934, entitled SYSTEM AND METHOD FOR DISPLAYING VEHICLE LOCATION AND POINT OF INTEREST INFORMATION, the disclosure of which is incorporated herein by reference and in connection with the flow diagrams of FIGS. 22A-22C.

The system, as best seen in FIG. 4, includes a current location detection device, such as GPS receiver 40, having an antenna 42 for receiving global positioning satellite signals from multiple satellites and providing current location data to one or more microprocessor(s) 50, which can be a Motorola MC9512DJ64 or its equivalent, through a universal asynchronous receiver/transmitter connection 44. Other current location detection sources of data, such as a Loran receiver, gyro compass, or dead reckoning information sources, may also be employed but a GPS receiver represents the current best mode of receiving such data. The microprocessor receives vehicle location data from the GPS receiver and point-of-interest and road network data from the flashcard 29, which is inserted into slot 28 and coupled to the one or more microprocessor(s) 50. An SRAM memory 31 is also coupled to the microprocessor(s) 50 and contains the system program. The microprocessor is also coupled to one or more operator-actuated switches in the switch section 24 and to a display 26, such as a dot matrix display, for selectively displaying information, such as shown in FIGS. 2 and 6-19, to the vehicle operator.

Figure 3:
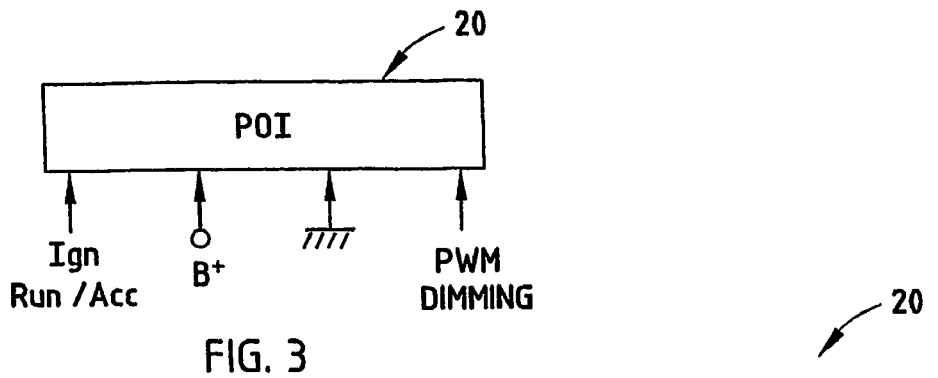
FIG. 3 is a block electrical diagram showing one interface connection of the system to the vehicle power system.
Figure 11:
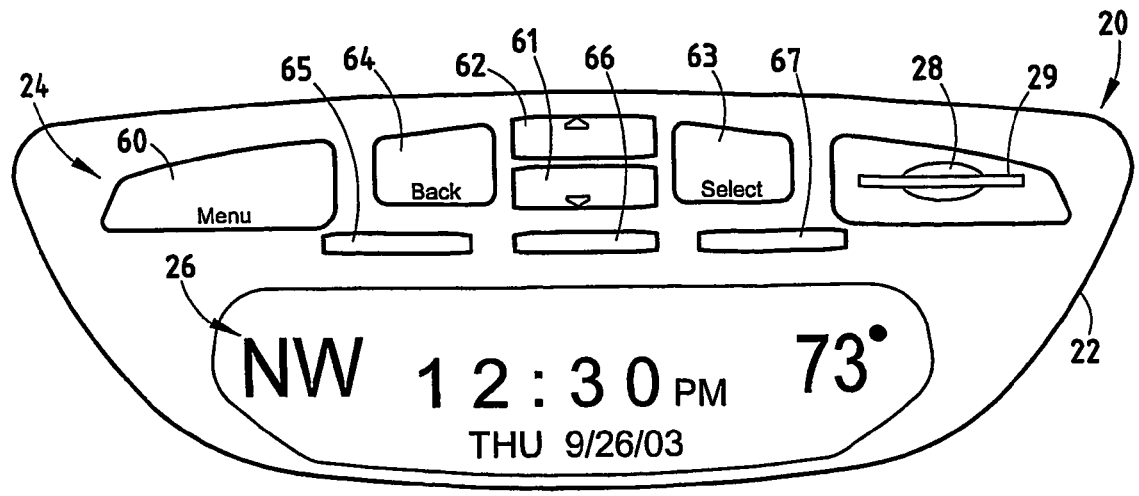
FIG. 11 is the display screen illustrating the information displayed to the vehicle operator when in a current-information mode of operation.

The point-of-interest circuit 20 is coupled to the vehicle power system, as shown in FIG. 3, and includes an ignition input for receiving power when the ignition is either in the run or accessory position, a B+ input drawing a maximum of 300 micro amps when the system is deactivated, a coupling to the system ground and a pulse width modulated dimming input circuit for dimming the back-lighted switches of the switch bank 24 and the dot matrix display 26 based upon the operator's selected lighting level for instrument displays. In some installations, the system could be coupled directly to the vehicle's power supply through the ignition switch and vehicle ground. In another, dimming information is received from the vehicle bus. The microprocessor 50 is also coupled to other vehicle systems, such as a vehicle compass 46 for displaying in the normal mode of operation, when the point-of-interest system is not being employed, the outside temperature, the compass heading, the time and date information, as seen in FIG. 11. The microprocessor may also be coupled to and employed for other vehicle control functions, such as a Homelink® brand programmable transmitter 48, and may be coupled to the vehicle bus 49 for receiving PWM dimming information, ignition run, accessory information, and the like. An outside temperature sensor and circuit 45 may be coupled to the microprocessor(s) 50 or the vehicle bus 49, as shown in FIG. 4, to provide the temperature display as seen in FIG. 11. Also, a trip computer 47 may be coupled to the microprocessor(s) 50 or to the vehicle bus 49, as shown in FIG. 4, to provide typical trip functions, such as a resettable odometer, fuel consumption, average speed, and estimated time of arrival information, which can be displayed on display 26.

Figure 2:
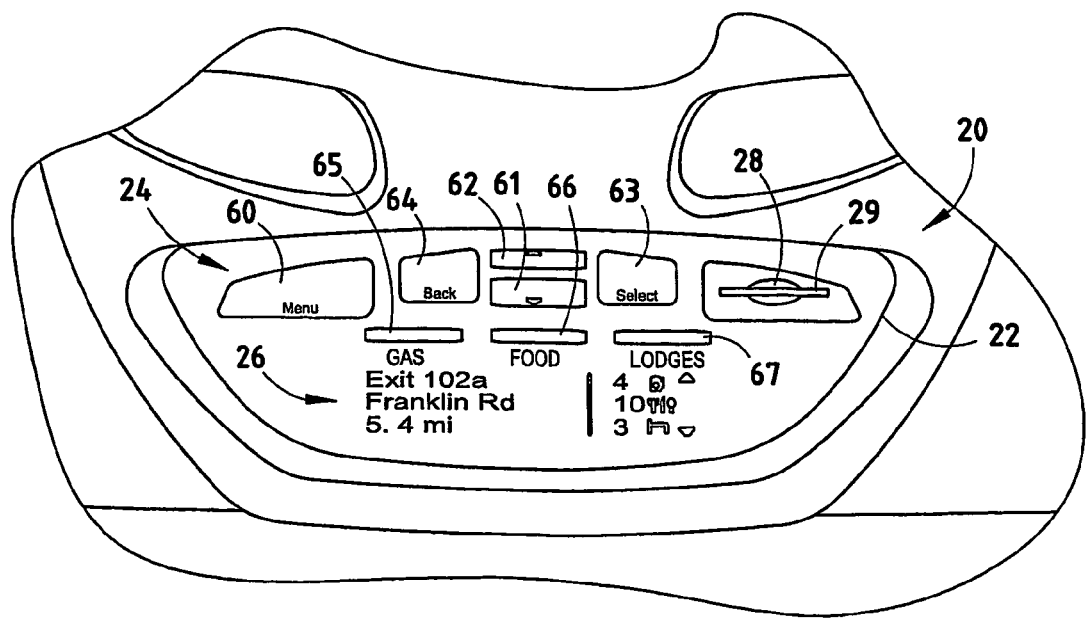
FIG. 2 is an enlarged fragmentary view of the system shown in FIG. 1.

The user-friendly, intuitive switch controls 24 are seen in FIG. 2 and incorporate a menu switch 60, a scroll forward switch 61, a scroll back switch 62, which are physically positioned on the console pointing in a forward and rearward position, respectively, with arrows thereon so as to intuitively indicate to the vehicle operator that the actuation of the scroll switches advances the display to a point of interest or highway exit forward or behind the vehicle. The switch controls 24 also includes a select switch 63 for selecting a given entry highlighted by the movement of a display cursor 27 (FIG. 8) through actuation of scroll switches 61 and 62 and a back switch 64, which allows the operator to move back one entry. Additionally, keys 65, 66, and 67 are provided and are aligned with display icons showing "gas", "food", and "lodges", respectively, as seen in FIG. 2. When the system is employed with a HomeLink® brand trainable transmitter, the switches can, when the POI system is off (FIG. 6), provide the dual function of operating any one of the three programmed transmitting frequencies and codes for up to three different garage doors, home appliances, security gates, or the like.

Figure 6:
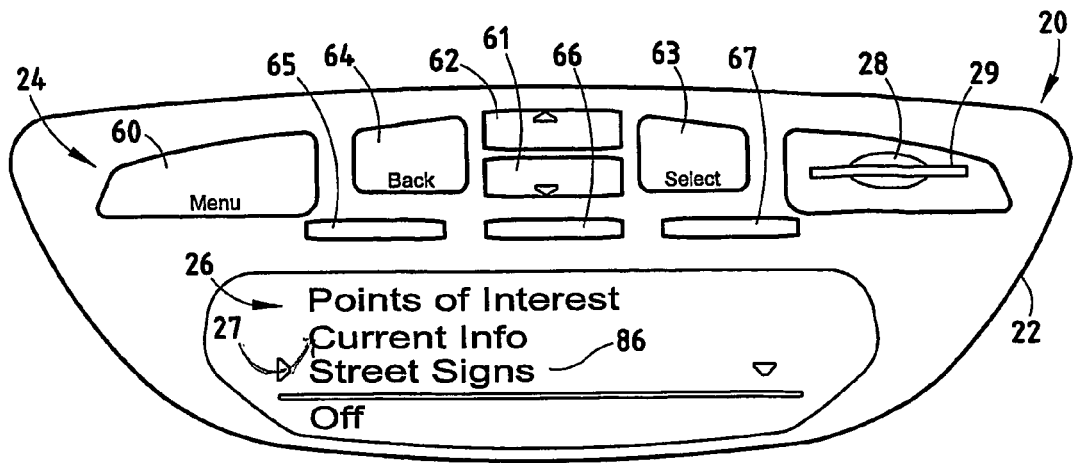
FIG. 6 is the display screen for the main menu.
Figure 17:
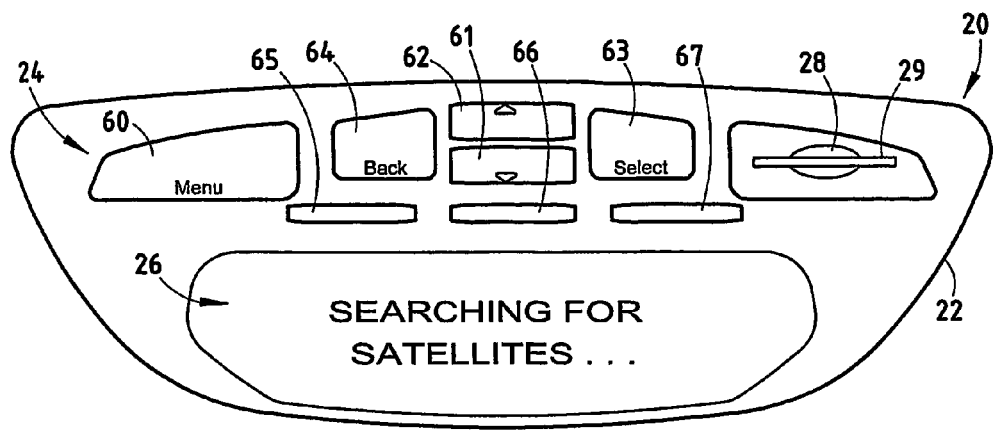
FIG. 17 is the display screen illustrating the information displayed to the vehicle operator during initial start up when the GPS receiver is looking for satellites.
Figure 20:
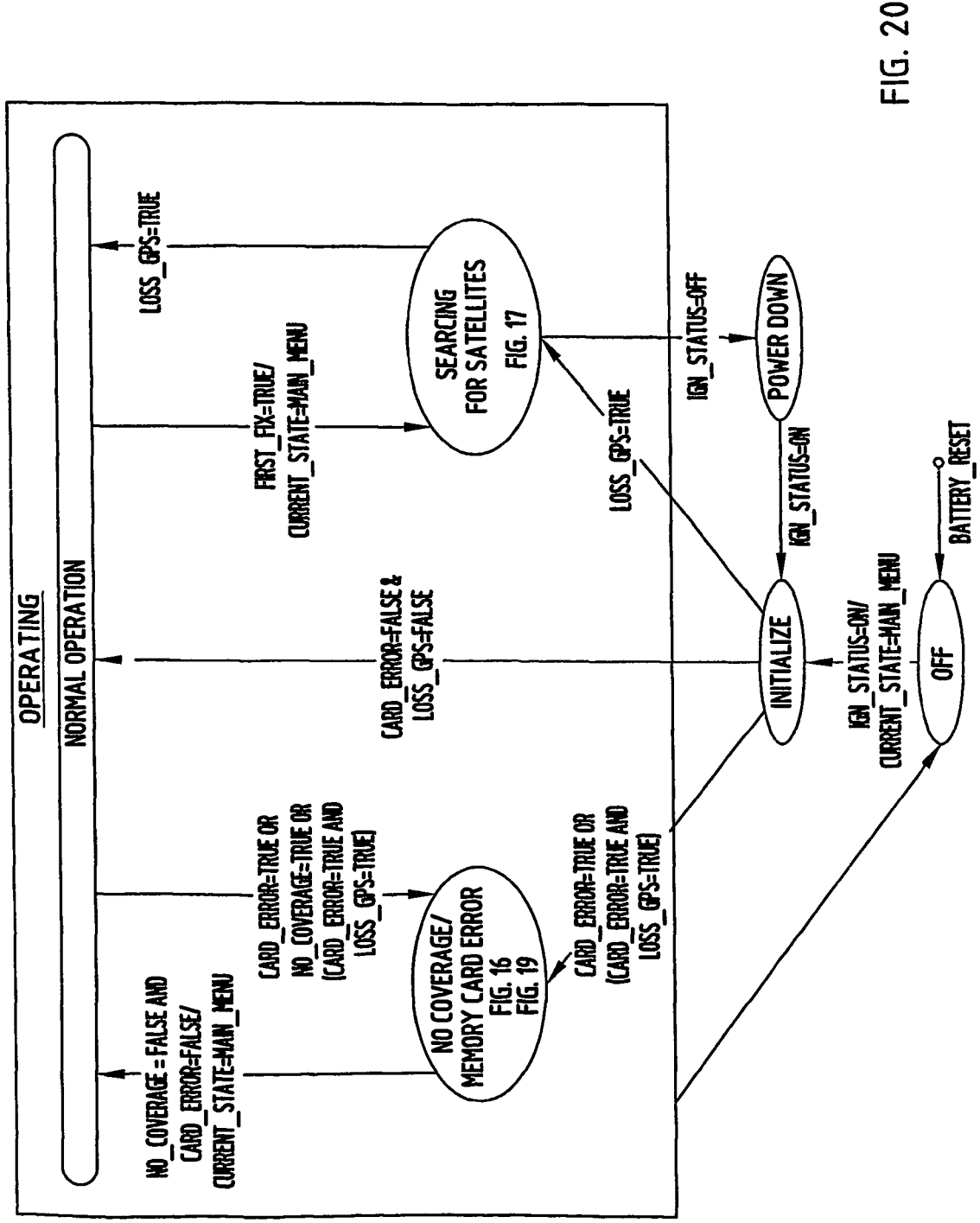
FIG. 20 is a flow diagram of the operation of the system during start up and shut down.
Figure 21:
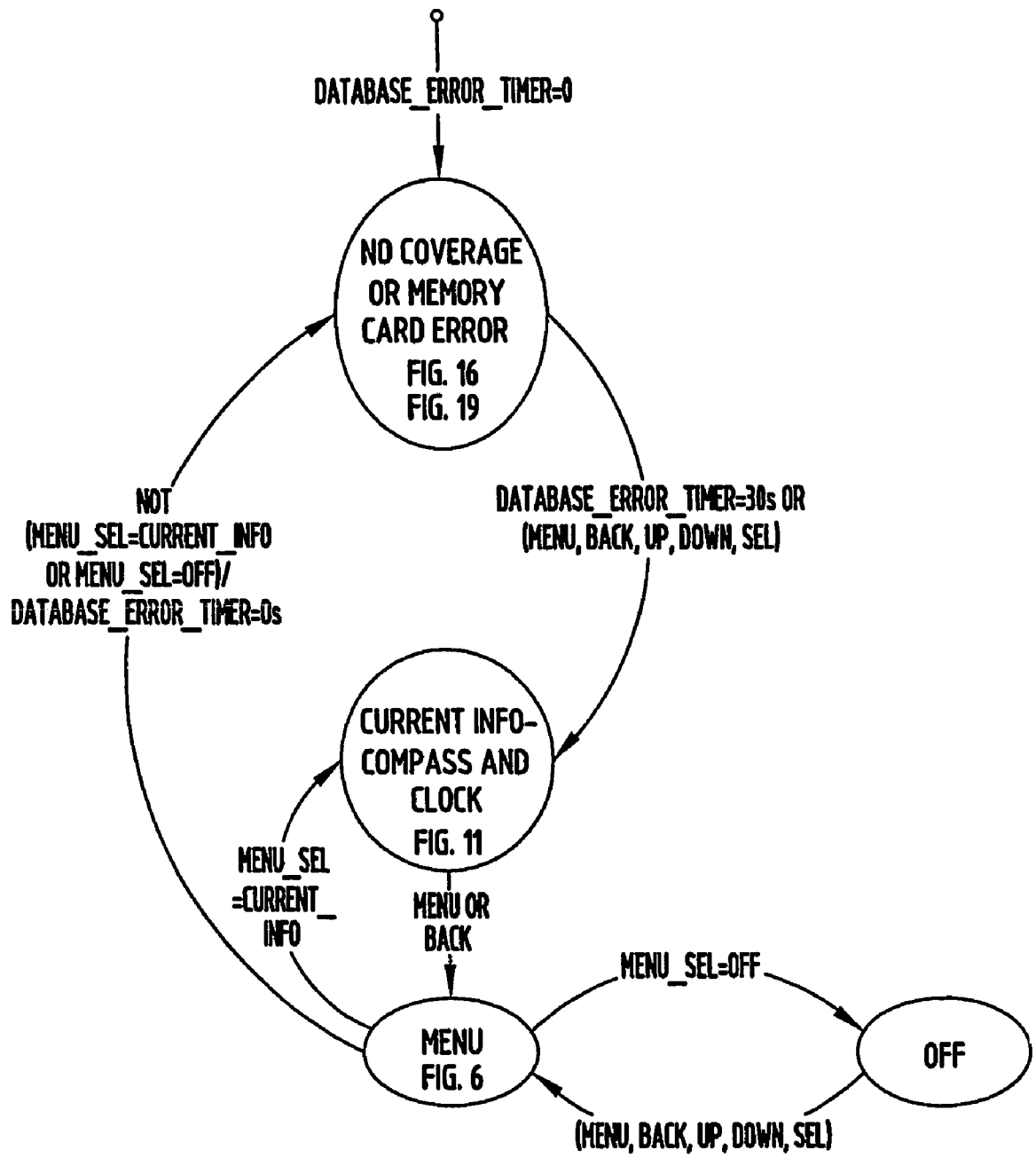
FIG. 21 is a flow diagram of the normal operation mode of the system.

The operation of the system seen in FIGS. 1-4 is best understood by reference to the program flow diagram of FIGS. 22A, 22B, and 22C together with the menu diagram with FIG. 5 in connection with the displayed information, as seen in FIGS. 2 and 6-19. Initially, when this system is powered up, as shown in FIG. 20, the system searches for satellites and displays a message, as shown by FIG. 17. In the event a memory card or flashcard 29 has not been inserted, the system displays the message shown in FIG. 19, either that the "memory card is not inserted" or the message shown in FIG. 16, that "the vehicle is out of the current data coverage zone." Assuming the memory card is in place and the vehicle is in the data coverage zone and satellite signals have been received, the display screen of FIG. 6 is displayed allowing the operator the option of selecting points of interest (POI) by scrolling, utilizing switches 61 and 62, current information which provides any combination of the compass heading, time, date, and/or outside temperature information of FIG. 11 or trip computer information (not shown). The operator may also select the street sign selection showing either the address of a street on which the vehicle is traveling, if on a secondary road, as shown by FIG. 9, or, if the scroll button is advanced and street signs has previously been selected, to the street sign display of FIG. 10.

Figure 7:
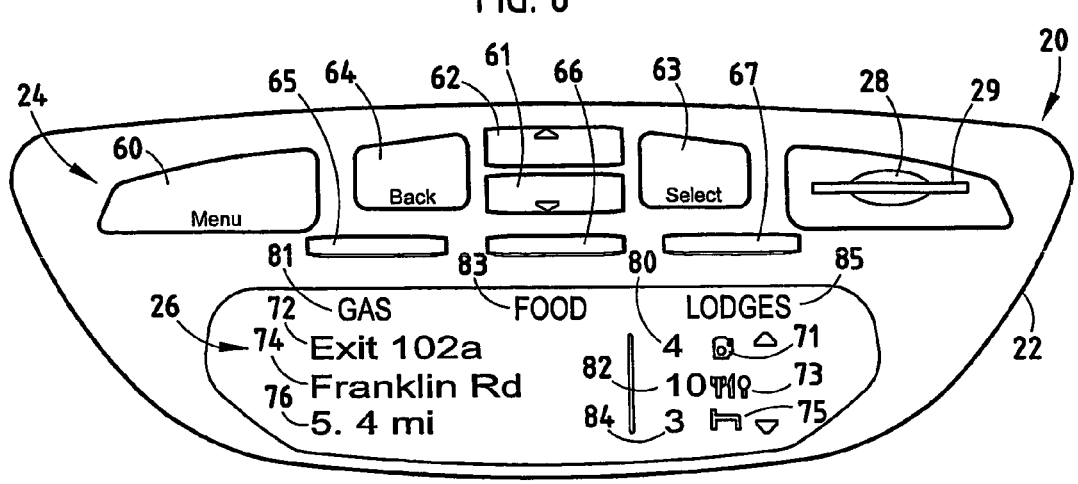
FIG. 7 is the display screen illustrating the information displayed to the vehicle operator when in a highway point-of-interest mode of operation.

Assuming the vehicle is on a limited access highway and the operator has selected "points of interest" by scrolling to move the cursor 27, shown in FIG. 6, to the "points of interest" selection, the operator enters select by actuating switch 63, and the highway point-of-interest mode, as shown in FIGS. 2 and 7, is displayed on display 26. Such display provides information as to points of interest according to categories of gas, food, or lodging, which are displayed as shown by display icons 71, 73, and 75 in FIGS. 2 and 7. Display 26 also displays the forthcoming exit which the vehicle is approaching, as indicated by display area 72 (FIG. 7), the name of the street associated with the exit, as indicated by display element 74, and the distance to the exit, as shown by display element 76. To the left of display icons 71, 73, and 75 is a numerical display 80 for indicating the number of gasoline stations available at that exit (i.e., 4 for exit 102a), a numerical display 82 indicating the number of restaurants available at that exit (i.e., 10), and a numerical display 84 indicating the number of lodges or sleeping accommodations available at that exit (i.e., 3). By actuating scroll switches 61 or 62, the operator can scroll forward to display, for example, the information available at the next exit (No. 103, for example) or the previous exit (No. 101, for example) if at exit 102 a desired POI is not available. Thus, while in the highway POI mode, the vehicle operator can look ahead or behind for points of interest and, as discussed below, select and review available points of interest at a selected exit. This enables the operator to find, for example, a favorite restaurant while traveling when meal time is approaching.

Figure 12:
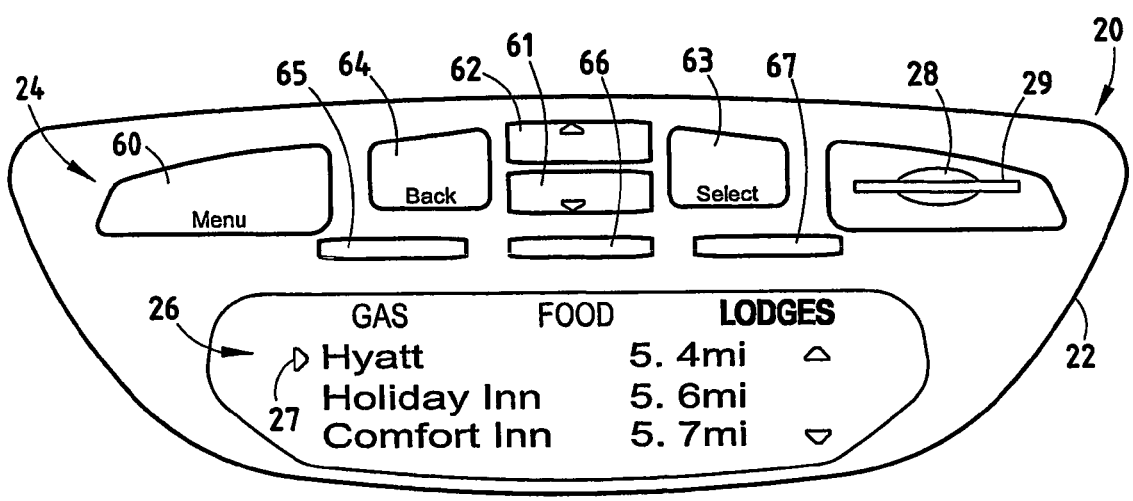
FIG. 12 is the display screen illustrating the information displayed to the vehicle operator when the lodging category has been selected in the point-of-interest modes shown in FIGS. 7, 8A and/or 8B.
Figure 13:
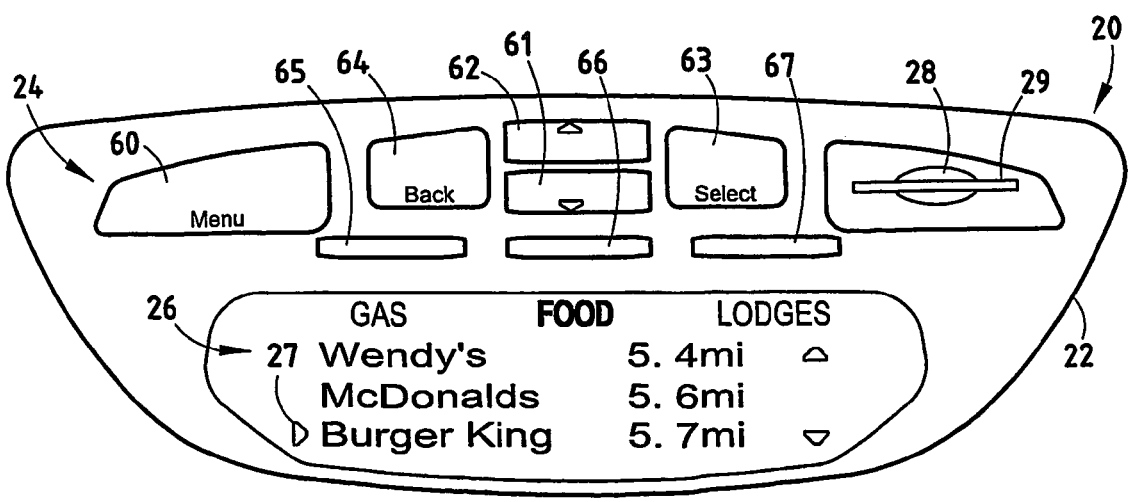
FIG. 13 is the display screen illustrating the information displayed to the vehicle operator when the food category has been selected in the point-of-interest modes shown in FIGS. 7, 8A and/or 8B.
Figure 14:
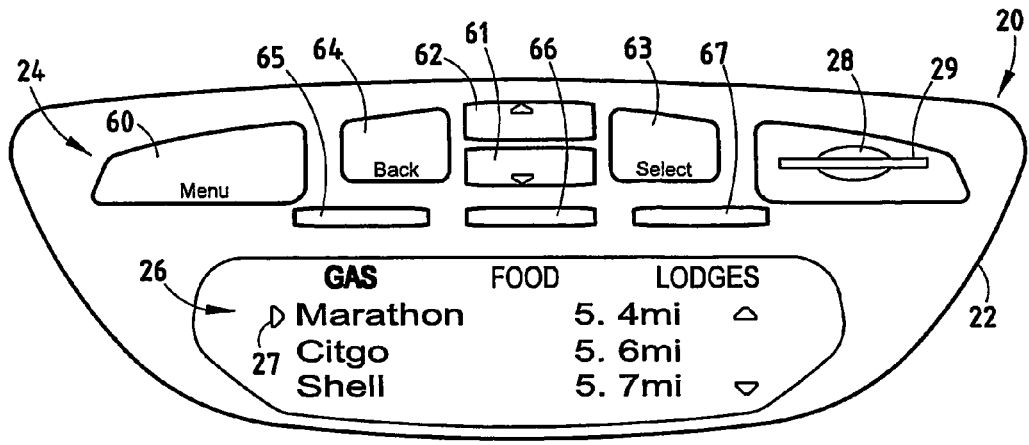
FIG. 14 is the display screen illustrating the information displayed to the vehicle operator when the gas category has been selected in the point-of-interest modes shown in FIGS. 7, 8A and/or 8B.

As the vehicle travels along the highway, the operator can actuate any one of the three keys 65, 66, or 67 aligned above the display 81 of "gas", display 83 of "food", or display 85 of "lodges", respectively, to select details of the establishments in the available categories at a selected exit. Thus, if the gas key 65 is actuated, the display of FIG. 14 appears, and the "gas" icon 81 is illuminated. The display of FIG. 14 provides three service stations available at the selected exit and their distance. A similar display presentation for restaurants is shown in FIG. 13 and for lodging is shown in FIG. 12.

Figure 15:
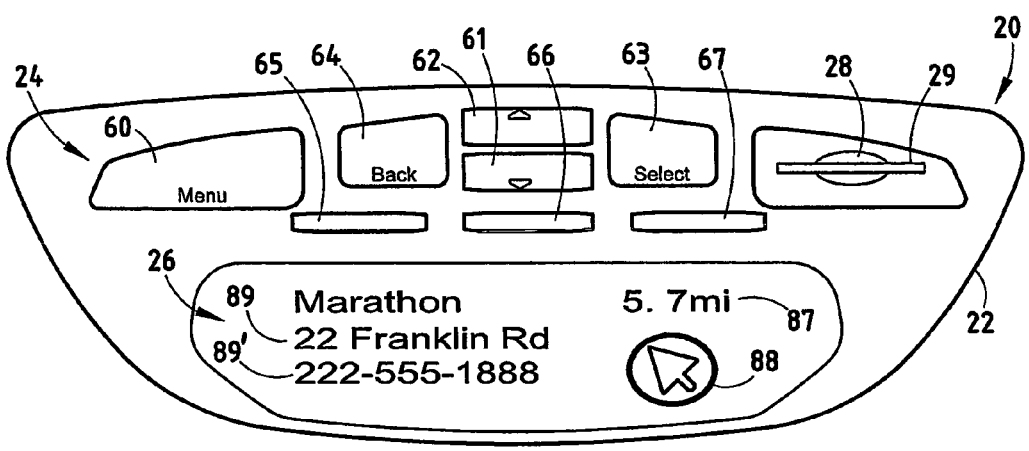
FIG. 15 is the display screen illustrating the information displayed to the vehicle operator when a particular point of interest in the highway mode has been selected.
Figure 16:
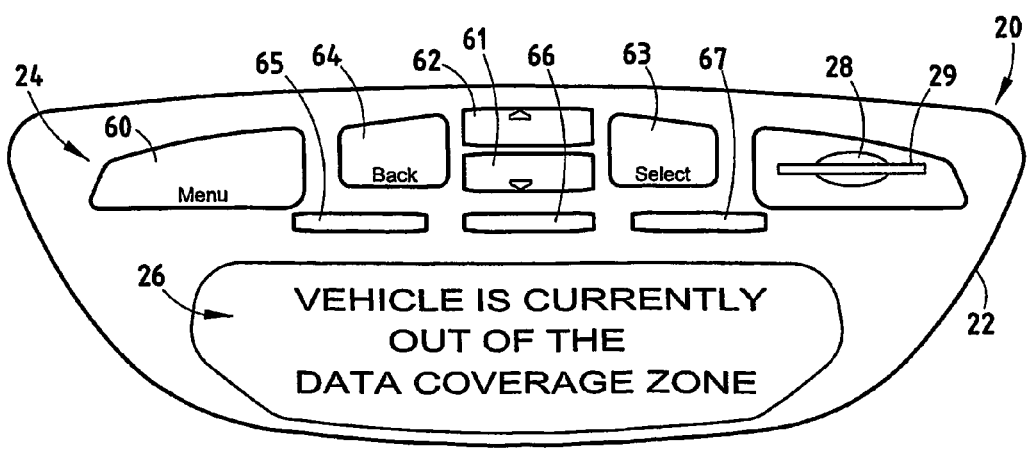
FIG. 16 is the display screen illustrating the information displayed to the vehicle operator when the vehicle is out of the coverage zone.

The operator can then scroll to the desired establishment, such as a Marathon station, as shown in FIG. 14, by actuation of switches 61 and 62 and select the establishment aligned with the cursor 27 to be presented with a more detailed route to point-of-interest display, as shown in FIG. 15. In FIG. 15, the operator has scrolled up to the Marathon station and actuated the select switch 63. The detail display 87 shows the distance to the Marathon station (i.e., 5.7 miles), and an arrow 88 shows the general direction of the station. The street address 89 of the service station, as well as its telephone number 89'. As the vehicle travels to the exit from which the POI was selected in the highway mode, this information is dynamically updated. Thus, arrow 88 changes direction and the distance information 87 of FIG. 15 is continuously updated. The distance displayed is the combined distance to the exit and from the exit to the Marathon station.

Figure 8A:
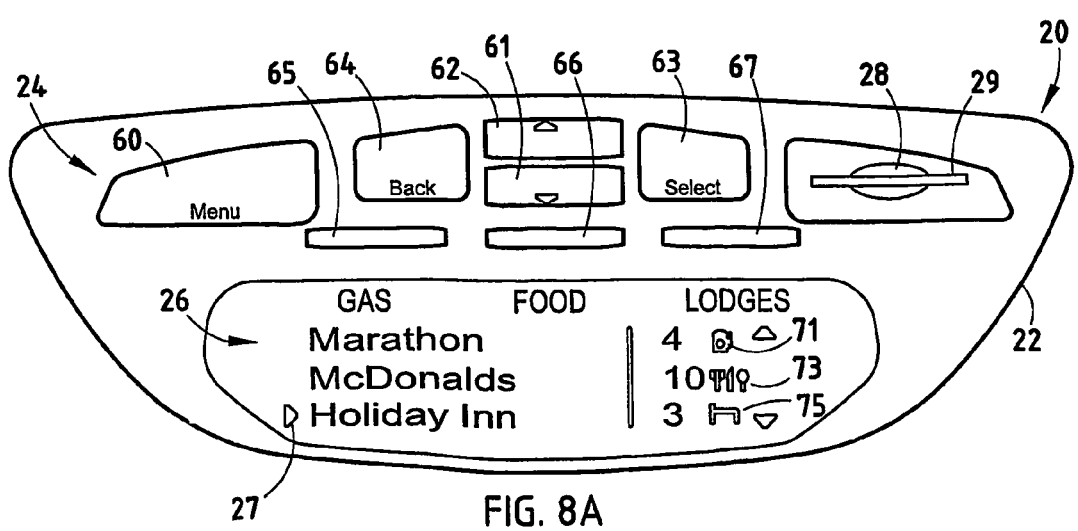
FIGS. 8A and 8B are alternate display screens illustrating the information displayed to the vehicle operator when in a local point-of-interest mode of operation.
Figure 8B:
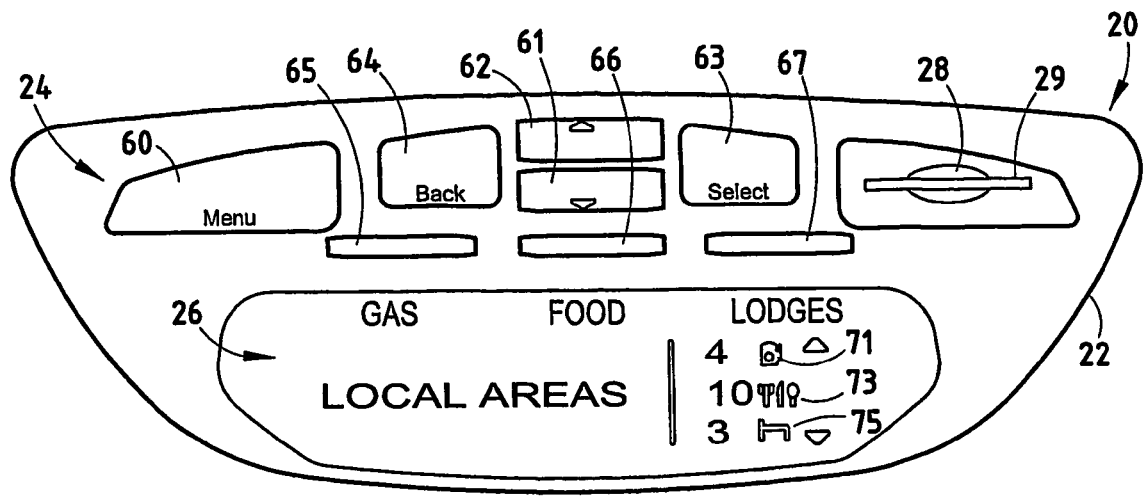
Figure 9:
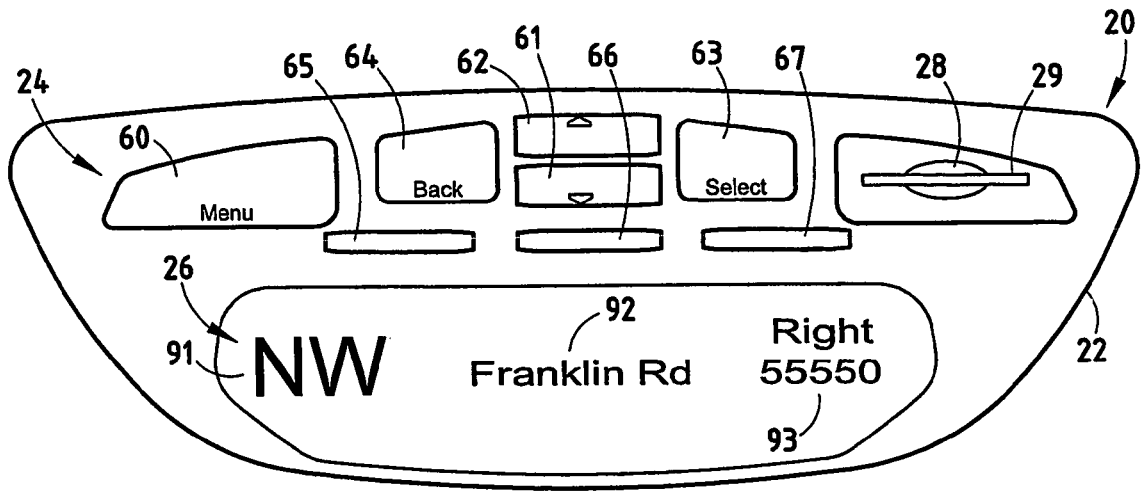
FIG. 9 is the display screen illustrating the information displayed to the vehicle operator when in a street-address mode of operation.

When the vehicle exits the highway, for example, at exit 102A, as shown in FIG. 7, the microprocessor detects from GPS signal and stored road network data programmed in the memory 31 that it is on a secondary road and automatically switches to one of the local point-of-interest displays shown in FIG. 8A or 8B, which, unless a POI has previously been selected as seen in FIG. 15, automatically displays the categories of points of interest available, the number of points of interest in each category through the icons 71, 73, and 75, and the nearest points of interest within a selectable range of, for example, two to four miles of the nearest points of interest regardless of the category. Again, the operator can select any one of the categories by actuating the switches 65, 66, and 67 after which the selected category will be displayed as shown in FIGS. 12-14, and a go-to point of interest can be selected by movement of the cursor through actuation switches 61 and 62 and entry of a highlighted point of interest by select switch 63 to obtain the information for that point of interest, as represented, for example, by FIG. 15. If a POI had previously been selected, the display of FIG. 15 remains displayed to the operator.

Figure 18:
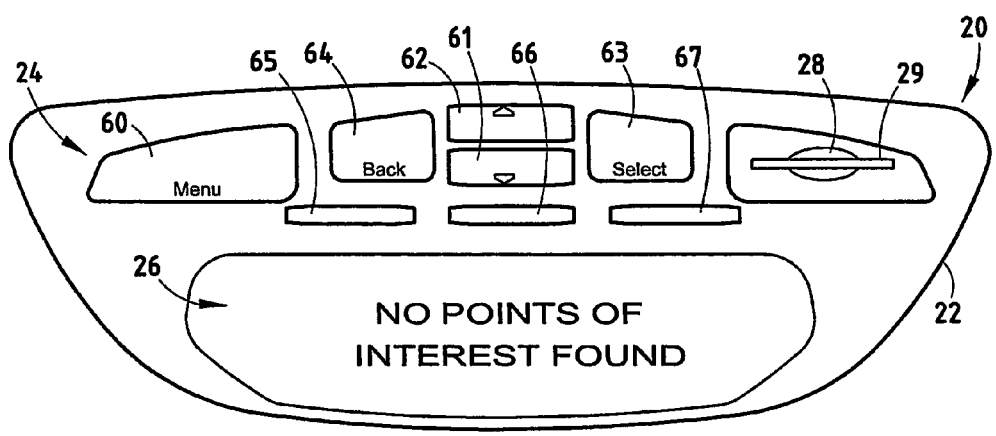
FIG. 18 is the display screen illustrating the information displayed to the vehicle operator when no point of interest was found at a selected exit.
Figure 19:
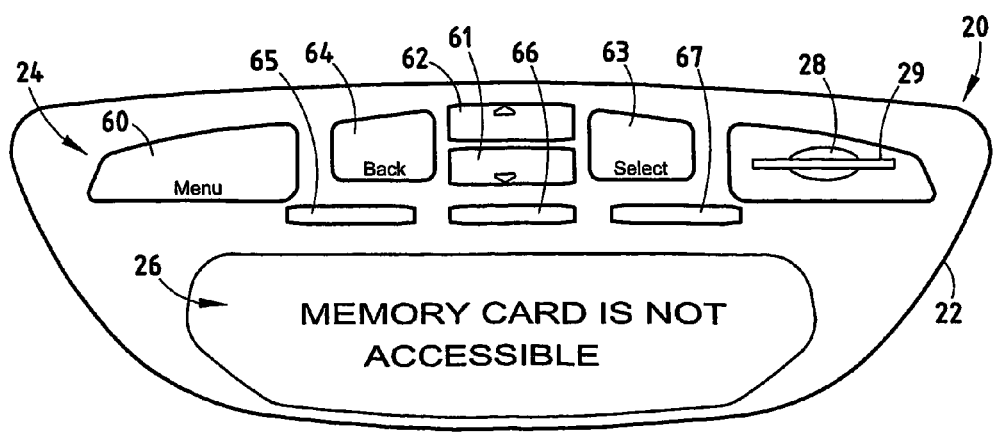
FIG. 19 is the display screen illustrating the information displayed to the vehicle operator in the event a memory card has not been inserted into the circuit.

If there are no points of interest found at a forthcoming exit, the display of FIG. 18 is displayed to the vehicle operator indicating that, at that exit, no selected category points of interest are available. The operator can either scroll forward to exits ahead of the vehicle or scroll backward using switches 61, 62 to a previous exit to look for a desired point of interest and determine which is the closest point of interest which satisfies the operator's needs. If on a local road and no POI are found within an initial search range, the system will expand the search range until a POI is found and display either the FIG. 8A or FIG. 8B display to the operator.

In addition to the point-of-interest mode of operation, the operator can enter the street sign mode from the main menu by pushing the menu switch 60 and scrolling to street signs (FIG. 6). By actuating the select switch 63, the display of FIG. 9 is presented to the operator, which shows the direction 91 of travel of the vehicle, the road 92 on which the vehicle is traveling, and a street address display 93, which shows the street numbers and which increments or decrements as the vehicle travels along the street, to provide the operator with the ability to locate a point of interest which may have previously been identified by street number or is otherwise known to the operator. This display is particularly helpful where the point of interest is set back from the road, such as, for example, in a shopping mall or the like, and the address is not readily visible from the road. As is well known, the displayed address is interpolated from two known locations and the current vehicle position with respect to such locations as determined by the GPS information.

Figure 10:
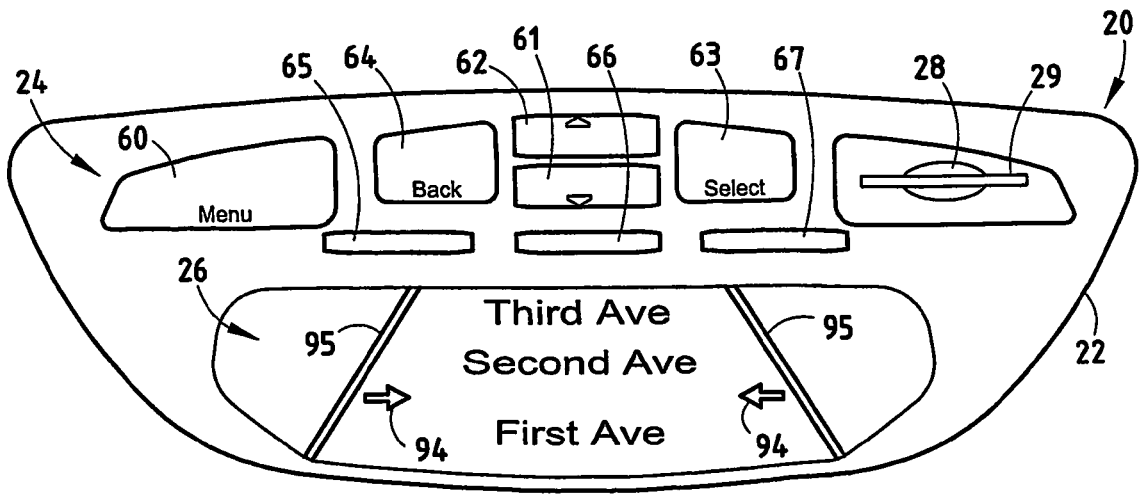
FIG. 10 is the display screen illustrating the information displayed to the vehicle operator when in a street-sign or cross-street mode of operation.

If the operator scrolls forward utilizing switch 61 while in the street sign mode displaying addresses, as shown in FIG. 9, the system enters the display of cross streets, as shown in FIG. 10, in which two streets ahead of the vehicle (e.g., Second Avenue and Third Avenue in FIG. 10) are presented, as are arrows 94 indicating the location of the vehicle between Second Avenue and recently passed First Avenue. This provides the operator with an easily recognizable display of cross streets on a roadway defined by converging graphic lines 95, which includes arrows 94 to provide a clear graphic diagram to the vehicle operator as to the vehicle's location with respect to forthcoming cross streets. In the event that the area does not provide cross-street information or street addresses for a given location of the vehicle, a display is provided to the operator, indicating that such information is not available and the operator must return to the main menu and enter the highway or local point-of-interest mode for guidance. The operator can always select the current information display of FIG. 11 by actuating the back button 64 when in any of the other modes until the information is displayed or actuate the menu button and actuate cursor switches 61, 62 to align cursor 27 with current information and actuate the select switch 63 to provide the compass, temperature, time, and date information display of FIG. 11.

FIG. 5 illustrates the various operational modes described above by the actuation of the select, menu, back, scroll, and POI switches to select points of interest, select a category contained within the points of interest, identify a particular establishment in that category, and go to the point-of-interest display, which provides detailed information as to how to approach the selected point of interest. The flow diagram 100 of FIGS. 22A, 22B, and 22C represents the programming of the microprocessor through the program contained in memory 31 of FIG. 4 to detect the actuation states of the various operator-actuated switches look at the data from the GPS receiver 40 and the flash memory 29 and display the resultant selected display information. The figure numbers of the display figures are included in the flow diagram 100.

Turning initially to FIG. 22A, the main menu 110 of FIG. 6 is displayed and the program looks at block 112 to determine if a highlighted entry has been selected and, if it has, whether the point of interest has been selected at block 114. If a point of interest display has been selected, the program moves to block 102 (FIG. 22B) and displays the point-of-interest menu of FIG. 7 or FIG. 8, depending on the location of the vehicle, either on a limited access highway or on a local roadway. If no entry has been selected in block 112, the program cycles through the main menu until such time as something has been selected by scrolling to and highlighting a desired entry. If no point of interest has been selected, the program detects at block 116 whether the street sign has been selected and, if not, at block 118, whether the current information has been selected. If current information has been selected, the display of FIG. 11 is presented, as shown by block 120. If street signs has been selected, the display of current address of FIG. 9 is presented as shown by block 122. If street signs is not selected and current information is, the program automatically updates from the data received from the compass, temperature sensor, and internal clock the information displayed in FIG. 11. The program then continues to detect at blocks 124 and 126 (FIG. 22B) whether or not menu or back has been selected. If not, it remains with the current display of FIG. 11.

If, at block 118, current information has not been selected, the program tests at block 128, whether the off selection has been entered and, if not, the program returns to the main menu 110. If off has been selected at block 128, the display is turned off, as indicated by block 134 (FIG. 22A), and the system is idle until such time as any switch has been depressed, as indicated by block 136. When this occurs, the program returns to the main menu block 110 of FIG. 22A.

If a point of interest display has been actuated as indicated by an affirmative decision in block 114, the program moves to block 102 (FIG. 22B), displaying either the FIG. 7 or FIG. 8 menu, as indicated above. If a point of interest is not selected as indicated by a no decision in block 104, the program continues to look to see if menu or back has been selected at 130, 132 and, if not, cycles through the loop, including blocks 102 and 104, until such time as either a lodging point-of-interest key 67 (FIG. 2) has been actuated as indicated by block 105, a gas point-of-interest key 65 (FIG. 2) has been actuated, or a food point-of-interest key 66 has been selected as indicated by blocks 105-107, respectively, in FIG. 22B. If one of these categories has been selected as indicated by block 108, the point of interest distance, direction, and location of FIG. 15 is displayed. The program then detects whether a menu or back select switches have been actuated at blocks 140 and 142 and, if so, the program returns to either the main menu or displays the point-of-interest menu, as indicated in block 102.

If "street signs" is selected as indicated in block 116 (FIG. 22A) and the address of FIG. 9 is displayed, the program tests to determine if a menu select or back select switch has been actuated as indicated by blocks 144 and 146 (FIG. 22B). If the menu select switch has been actuated, the program returns to the main menu of block 110. If not and the back select switch has been actuated by an affirmative decision in block 142, the program also returns to the main menu. If the back select switch has not been actuated, the program tests to determine if the down arrow at block 148 has been actuated. If it has, the program displays the street sign mode of FIG. 10, as shown at block 150 and continues to display that until such time as either the menu select switch at block 152 has been actuated or the back select switch at block 154 has been actuated or the up arrow as indicated by block 156 has been actuated. If the down arrow select switch has not been actuated at block 148, the program returns to the current address display as shown at block 122. If the arrow up select switch has been actuated as indicated by an affirmative decision at block 156 or the back select switch activated, the program returns to the current address display of FIG. 9 indicated at block 122.

Thus, the flow diagram of the program of FIGS. 22A-22C illustrates the operation performed by the program during a sequence of operation through the menu as shown also in FIG. 5, as well as at the same time updating the location information from the GPS receiver and selected point-of-interest information, including distance to and/or direction to the selected point-of-interest information being displayed.

It will become apparent to those skilled in the art that various modifications to the preferred embodiment of the invention as described herein can be made without departing from the spirit or scope of the invention as defined by the appended claims.

The invention claimed is:

1. A control system for mounting to a vehicle comprising:
a first input configured to receive data representing a current position of the vehicle;
a memory configured to store a database of road network information comprising street names and addresses along the streets;
a microprocessor coupled to said first input and to said memory, the microprocessor configured to provide display signals representing location information as the vehicle moves along a street; and
a second input coupled to said microprocessor and configured to receive a user selection and to provide the user selection to the microprocessor;
wherein the microprocessor is configured to use the user selection to switch between at least (a) causing an electronic display to display addresses on the street on which the vehicle is traveling without also displaying a map on the electronic display and (b) causing the electronic display to display names of cross-streets ahead of and behind the vehicle without also displaying a map on the electronic display;
wherein said first input receives data from a GPS receiver; and
wherein the microprocessor is further configured to cause the electronic display to display graphic lines depicting sides of a roadway when the cross-streets ahead of and behind the vehicle are displayed, wherein the representation of the cross streets are positioned between the lines.

2. The control system as defined in claim 1, wherein the microprocessor is further configured to cause the electronic display to display the street name on which the vehicle is traveling when the addresses on the street on which the vehicle is traveling is displayed.

3. The control system as defined in claim 1 wherein the microprocessor is further configured to cause the display of at least one arrow aligned with respect to the cross streets at a display position indicating the geographic position of the vehicle with respect to the cross streets.

4. The control system as defined in claim 3 wherein the microprocessor is configured to cause the display of two cross streets ahead of the vehicle.

5. The control system as defined in claim 4 wherein the microprocessor is further configured to cause the display of two additional arrows, with each additional arrow positioned adjacent each graphic line representing a side of a roadway.

6. The control system as defined in claim 1 wherein said database further comprises points of interest and wherein the microprocessor is configured to use input received at the second input to allow a user to select a point of interest from a menu of available points of interest when on a highway, and to cause the display of distance and direction to said selected point of interest and, after exiting a highway, to cause the display of detailed information regarding the selected point of interest.

7. The control system as defined in claim 6 wherein said database further comprises data sets layered according to road network information and point-of-interest information such that said road network information and point-of-interest information can be updated separately and at different time intervals.

8. The control system as defined in claim 1 wherein said database comprises data sets layered according to road network information and point-of-interest information such that said road network information and point-of-interest information can be updated separately at different time intervals.

9. The control system as defined in claim 1 wherein said database further comprises points of interest and wherein a user selection received at the second input and the microprocessor permits the selective display of the exits on a highway on which the vehicle is traveling, wherein said microprocessor is configured to cause the generation of a scroll-forward display of upcoming highway exits and points of interest accessible at such highway exits.

10. The control system as defined in claim 1 wherein an electronic compass is coupled to said display.

11. The control system as defined in claim 1 wherein an outside temperature sensor is coupled to said display.

12. The control system as defined in claim 1 wherein a trip computer is coupled to said display.

* * * * *